(12) United States Patent
Whittle et al.

(10) Patent No.: US 11,149,567 B2
(45) Date of Patent: Oct. 19, 2021

(54) CERAMIC MATRIX COMPOSITE LOAD TRANSFER ROLLER JOINT

(71) Applicants: Rolls-Royce Corporation, Indianapolis, IN (US); Rolls-Royce plc, London (GB)

(72) Inventors: Michael J. Whittle, Derby (GB); Daniel Kent Vetters, Indianapolis, IN (US); Eric Koenig, Fishers, IN (US)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 532 days.

(21) Appl. No.: 16/133,187

(22) Filed: Sep. 17, 2018

(65) Prior Publication Data

US 2020/0088048 A1 Mar. 19, 2020

(51) Int. Cl.
*F01D 9/04* (2006.01)
*F01D 5/28* (2006.01)

(52) U.S. Cl.
CPC ............. *F01D 9/042* (2013.01); *F01D 5/284* (2013.01); *F05D 2220/32* (2013.01); *F05D 2300/6033* (2013.01)

(58) Field of Classification Search
CPC ..... F01D 9/00; F01D 9/02; F01D 9/04; F01D 9/041; F01D 9/042; F01D 5/28; F01D 5/282; F01D 5/284; F01D 25/16; F01D 25/162; F05D 2300/5021; F05D 2300/50211; F05D 2300/50212; F05D 2300/603; F05D 2300/6033; F05D 2240/50

See application file for complete search history.

(56) References Cited

U.S. PATENT DOCUMENTS

| | | | |
|---|---|---|---|
| 3,075,744 A * | 1/1963 | Peterson | F01D 5/189 415/115 |
| 4,396,349 A * | 8/1983 | Hueber | F01D 5/284 415/115 |
| 5,051,002 A * | 9/1991 | Hanaway | F16C 29/04 384/49 |
| 5,284,011 A | 2/1994 | Von Benken | |
| 5,630,700 A | 5/1997 | Olsen et al. | |
| 6,325,593 B1 | 12/2001 | Darkins, Jr. et al. | |
| 6,464,456 B2 | 10/2002 | Darolia et al. | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 7,114,917 B2 | 10/2006 | Legg | |
| 7,452,189 B2 | 11/2008 | Shi et al. | |
| 7,762,766 B2 | 7/2010 | Shteyman et al. | |
| 7,824,152 B2 | 11/2010 | Morrison | |
| 8,454,303 B2 | 6/2013 | Garcia-Crespo | |
| 9,097,141 B2 | 8/2015 | Paradis | |
| 9,335,051 B2 | 5/2016 | Jarmon et al. | |
| 9,546,557 B2 | 1/2017 | Grooms, III et al. | |
| 9,915,159 B2 | 3/2018 | Huizenga et al. | |
| 9,995,160 B2 | 6/2018 | Sarawate et al. | |
| 10,174,627 B2 | 1/2019 | Chang et al. | |

(Continued)

*Primary Examiner* — Christopher Verdier
*Assistant Examiner* — Elton K Wong
(74) *Attorney, Agent, or Firm* — Barnes & Thornburg LLP

(57) ABSTRACT

An airfoil assembly includes a roller joint formed between a ceramic airfoil portion and a carrier allowing sliding (rolling) radial movement therebetween to accommodate thermal growth disparity.

17 Claims, 4 Drawing Sheets

(56) References Cited

U.S. PATENT DOCUMENTS

| | | | |
|---|---|---|---|
| 2006/0133925 A1* | 6/2006 | Bouru | F01D 17/162 |
| | | | 415/160 |
| 2014/0001285 A1 | 1/2014 | Grooms, III et al. | |
| 2014/0255174 A1 | 9/2014 | Duelm et al. | |
| 2016/0003072 A1 | 1/2016 | Chang et al. | |
| 2016/0123163 A1 | 5/2016 | Freeman et al. | |
| 2016/0177761 A1 | 6/2016 | Huizenga et al. | |
| 2016/0201488 A1 | 7/2016 | Carr et al. | |
| 2016/0290147 A1 | 10/2016 | Weaver | |
| 2017/0022833 A1 | 1/2017 | Heitman et al. | |
| 2017/0051619 A1 | 2/2017 | Tuertscher | |
| 2017/0298748 A1 | 10/2017 | Vetters et al. | |
| 2018/0045117 A1 | 2/2018 | Groves, II et al. | |
| 2018/0223680 A1 | 8/2018 | Hafner | |
| 2018/0328187 A1 | 11/2018 | Oke | |
| 2018/0340431 A1 | 11/2018 | Kerns et al. | |
| 2018/0370158 A1 | 12/2018 | Gather et al. | |

\* cited by examiner

US 11,149,567 B2

CERAMIC MATRIX COMPOSITE LOAD TRANSFER ROLLER JOINT

BACKGROUND

The present disclosure relates generally to component for turbomachinery, and more specifically to components for turbomachinery such as gas turbine engines.

Gas turbine engines are used to power aircraft, watercraft, electric power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The relatively high temperatures generated, as well as the adapted uses of such gas turbine engines, can be advantageously endured by ceramic materials. However, supporting ceramic materials can create challenges including challenges related to different thermal growth rates.

SUMMARY

The present disclosure may comprise one or more of the following features and combinations thereof.

According to one aspect of the present disclosure, an airfoil assembly of a gas turbine engine may include a ceramic airfoil including a pair of endwalls defining a radial gas flow path extent and an airfoil body extending radially between the endwalls, the airfoil body defining an internal cavity extending radially and communicating through each endwall, a support carrier for supporting the ceramic airfoil, the metallic support carrier including radially inner and outer portions each defining receivers for engagement with the ceramic airfoil, and a roller joint for supporting rolling engagement between the ceramic airfoil and the metallic support carrier to accommodate radial thermal growth disparity. The roller joint may include a roller race disposed on one of the ceramic airfoil and the metallic support carrier. At least one rolling element may be supported by the roller race and engaged with the other of the ceramic airfoil and the metallic support carrier.

In some embodiments, the roller joint may be arranged in one of the receivers of the inner and outer portions. The roller race may be disposed on the ceramic airfoil. A roller engagement surface for support radial rolling movement of the roller element may be formed on the support carrier. The roller engagement surface may be a radially oriented surface of defining a portion of one of the receivers.

In some embodiments, the at least one roller element may include at least two roller elements. The at least two roller elements may be arranged radially spaced apart from each other. The ceramic airfoil may include an extension portion. The extension portion may project radially from one of the endwalls for engagement with the corresponding one of the inner and outer portions of the support carrier.

In some embodiments, the roller race may be fixed with the extension portion of the ceramic airfoil. The at least one rolling element may be exposed from the roller race perpendicular to radial for engagement with the support carrier.

According to another aspect of the present disclosure, a vane airfoil assembly of a gas turbine engine may include a ceramic vane airfoil including a pair of endwalls defining a radial gas flow path extent and a body extending radially between the endwalls, the body defining an internal cavity extending radially and communicating through each endwall, a support carrier for supporting the vane airfoil, the support carrier including radially inner and outer portions each defining receivers for engagement with the vane airfoil, and a roller joint for supporting axial load transfer between the vane airfoil and the support carrier to accommodate radial thermal growth disparity. The roller joint may include a roller race disposed on one of the vane airfoil and the metallic carrier. At least one rolling element may be supported by the roller race and engaged with the other of the vane airfoil and the support carrier.

In some embodiments, the roller joint may be arranged in one of the receivers of the inner and outer portions. The roller race may be disposed on the vane airfoil. A roller engagement surface for support radial rolling movement of the roller element may be formed on the support carrier.

In some embodiments, the roller engagement surface may be a radially oriented surface of defining a portion of one of the receivers. The at least one roller element may include at least two roller elements. The at least two roller elements may be arranged radially spaced apart from each other.

In some embodiments, the vane airfoil may include an extension portion. The extension portion may project radially from one of the endwalls for engagement with the corresponding one of the inner and outer portions of the support carrier. The roller race may be secured with the extension portion of the vane airfoil. The at least one rolling element may be exposed from the roller race perpendicular to radial for engagement with the support carrier.

These and other features of the present disclosure will become more apparent from the following description of the illustrative embodiments.

DETAILED DESCRIPTION OF THE DRAWINGS

Figure 1:
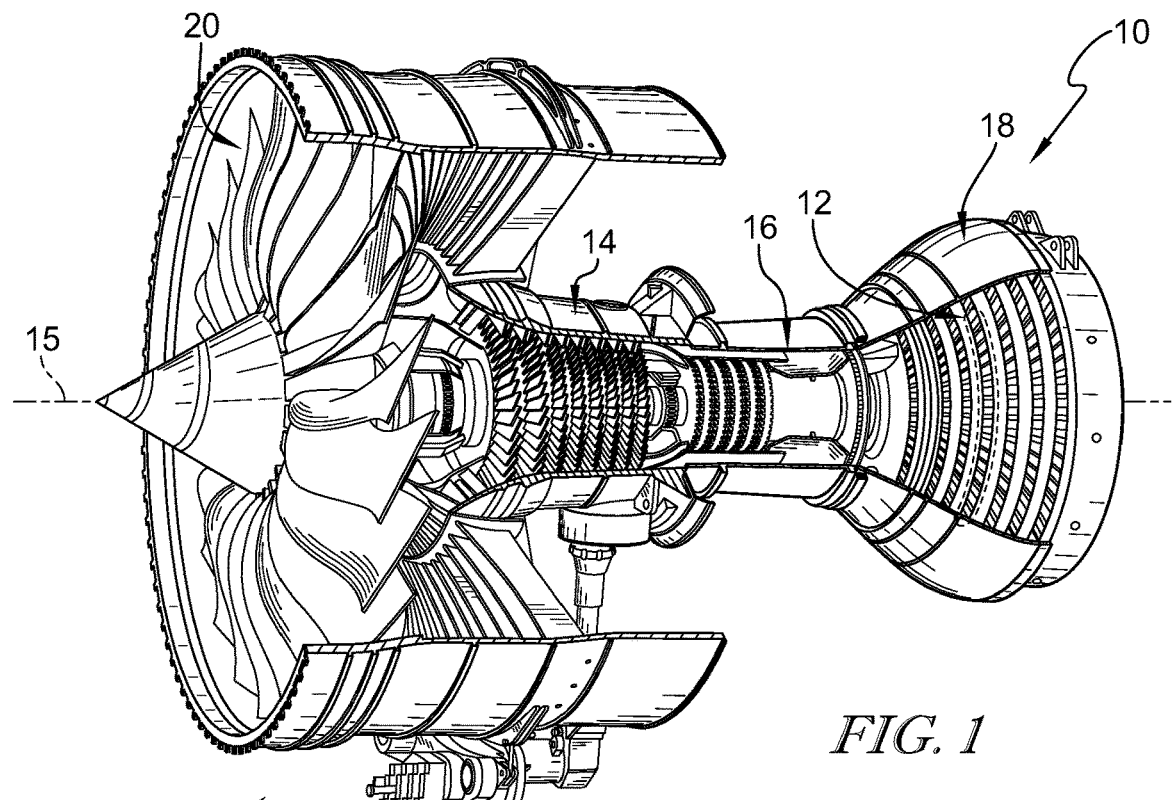
FIG. 1 is perspective view of a gas turbine engine having a portion cutaway to reveal certain internals including an airfoil assembly of the turbine section for guiding hot, high pressure exhaust flow to expand across turbine blades to rotate a rotor.

For the purposes of promoting an understanding of the principles of the disclosure, reference will now be made to a number of illustrative embodiments illustrated in the drawings and specific language will be used to describe the same.

Ceramic materials, including ceramic matrix composites (CMC), can provide advantages to gas turbine engine operation. For example, CMCs can offer excellent performance at high temperatures/pressures while maintaining lower weight than many other materials. Yet, supporting CMCs in adapted uses for engagement with high temperature/pressure exhaust flow can present challenges. For example, interfacing such CMC materials with supporting structures which may include metallic materials can be challenging due to differences in thermal growth along the operating range of the gas turbine engine.

An illustrative airfoil assembly 12 including ceramic materials in adapted use in the gas turbine engine 10 is shown in FIG. 1. The gas turbine engine 10 includes a compressor 14 which compresses air for combustion. The compressed air is mixed with fuel and combusted within a combustor 16 to produce high temperature and/or pressure exhaust flow.

The gas turbine engine 10 includes a turbine section 18 arranged to receive and expand the exhaust flow across its blades to drive a rotor and shaft to provide rotational energy to the compressor 14 and, optionally, a fan 20 for rotation about a rotational axis 15. The airfoil assembly 12 is embodied as a turbine vane assembly engaging with the high temperature and/or high pressure exhaust flow to guide the exhaust flow within the turbine section 18.

Figure 2:
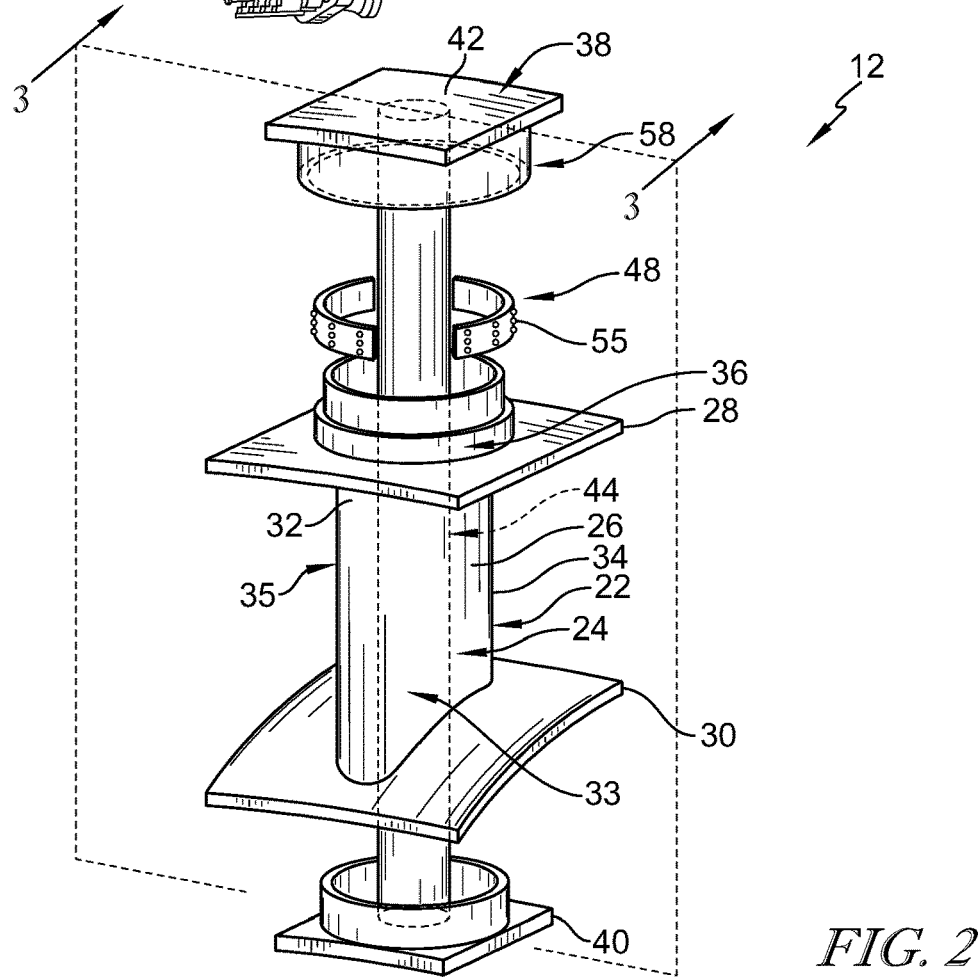
FIG. 2 is a perspective view of the airfoil assembly of FIG. 1 exploded to show that the airfoil assembly includes a ceramic airfoil shell and a carrier arranged to support the airfoil shell, the carrier being shown artificially elongated for descriptive ease.

As shown in FIG. 2, the airfoil assembly 12 comprises an airfoil shell 22 including a body 24 defining an airfoil shape by its exterior surface 26 for guiding exhaust flow through the gas turbine engine 10. The airfoil shell 22 is formed of ceramic matrix composite materials, for example, silicon carbide (SiC) fiber reinforced matrix. The airfoil shell 22 includes endwalls 28,30 connected on either radial end of the body 24 to define radial flow path boundaries.

The airfoil body 24 of the illustrative airfoil assembly 12 extends radially (up and down in FIG. 2) between the endwalls 28, 30 and includes a leading edge 32 disposed upstream and trailing edge 34 disposed downstream. The airfoil body 24 defines a pressure side 33 and a suction side 35 for passing exhaust flow. The airfoil shell 22 includes an extension portion 36 extending radially to position the airfoil body 24 for guiding the exhaust flow.

The airfoil assembly 12 illustratively includes a carrier 38 for connection with the airfoil shell 22 to support the airfoil shell 22 in position to guide the exhaust flow. The carrier 38 is embodied to include an inner portion 40 and outer portion 42. A spar 44 extends between the inner and outer portions 40, 42 (the spar 44 being shown elongated in FIG. 2 for descriptive purposes). In the illustrative embodiment, the carrier 38 is embodied as a metallic carrier for connection with an outer casing of the turbine section 18 to support the airfoil body 24 for guiding the exhaust flow.

Figure 3:
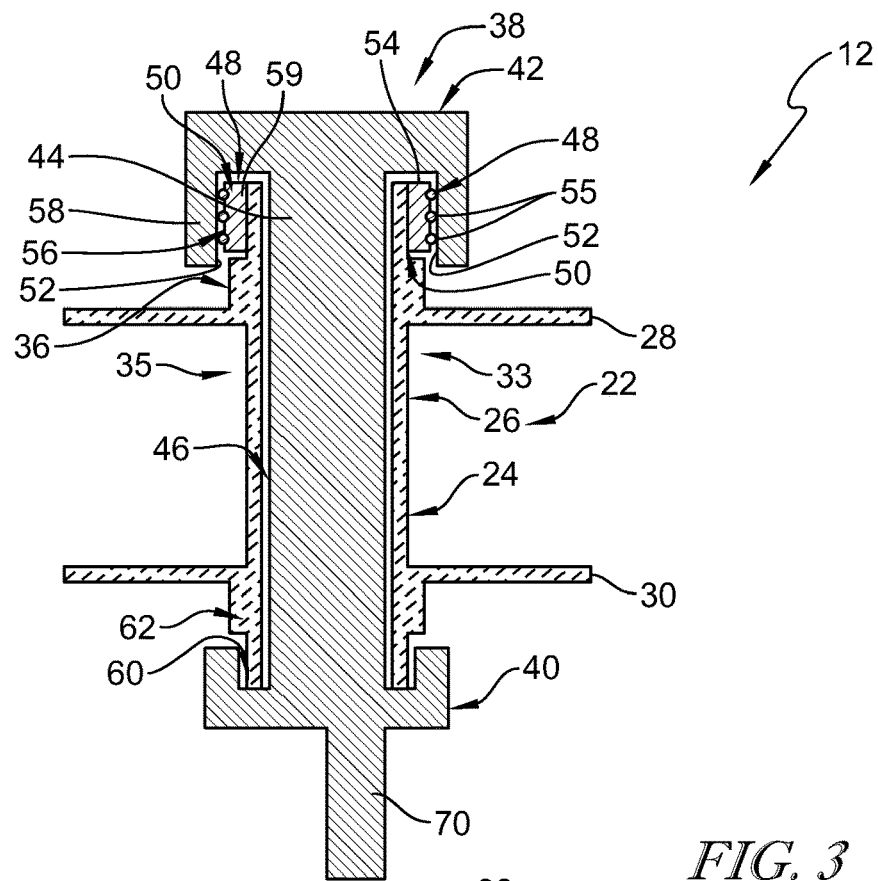
FIG. 3 is a cross-sectional view of the airfoil assembly of FIG. 2 in an assembled state, taken along the plane 3-3 of FIG. 2, showing that a roller joint is formed between the airfoil shell and the carrier to permit relative radial movement (up and/or down) to accommodate different thermal growth of the ceramic airfoil shell relative to the carrier.

As shown in FIG. 3, the airfoil shell 22 illustratively includes a hollow cavity 46 defined through the body 24. The spar 44 extends through the hollow cavity 46 to connect with each of the inner and outer portions 40, 42. The extension portion 36 of the airfoil shell 22 engages with the carrier 38 for support. Roller joints 48 are formed between the airfoil shell 22 and the carrier 38 to permit rolling engagement therebetween to accommodate radial thermal growth disparity.

The roller joints 48 are each illustratively embodied to include a roller bearing 50 and a bearing surface 52. The roller joints 48 transfer axial loading (and/or lateral loading in the orientation of FIG. 3) between the carrier 38 and airfoil shell 22 while permitting relative radial movement. The roller bearing elements 55 are arranged to permit sliding (rolling) contact with the corresponding bearing surface 52 to allow relative radial movement between the airfoil shell 22 and the carrier 38 to accommodate different thermal growth rates. Each roller bearing 50 includes a bearing race (inner and outer race) 54 and roller elements 55 arranged within the bearing race 54 and engaged with the bearing surface 52.

Each bearing race 54 is illustratively secured with the extension portion 36, on opposite sides of the airfoil shell 22 (pressure and suction side), although in some embodiments, roller joints 48 may be arranged in any suitable position about the extension portion 36 (i.e., circumferentially about the axis of radial extension of the extension portion 36). Although two roller joints 48 each having three rolling elements 55 are depicted, any suitable number of roller joints 48 and/or rolling elements 55 for each race 54 may be applied.

The bearing races 54 are embodied as secured with the airfoil shell 22, and the bearing surface 52 is formed on the carrier 38 40. However, in some embodiments, the bearing race 54 can be secured with the carrier 38 and the bearing surface 52 can be formed on the airfoil shell 22. In some embodiments, the bearing race 54 may be excluded and the rolling elements can be fixed for radial translation with the airfoil shell 22 (or carrier 38) in rolling contact with the carrier 38 (or airfoil shell 22).

As shown in FIG. 3, the carrier 38 defines a receiver 56 for engagement with the airfoil shell 22. The outer portion 42 of the carrier 38 includes an engagement wall 58 extending radially to provide the bearing surface 52. The engagement wall 58 illustratively overlaps radially with the extension portion 36 to have corresponding arrangement with the roller bearing 50 for engagement to support relative radial movement of the airfoil shell 22 and carrier 38.

On the radially inner end, the airfoil shell 22 engages the inner portion 40 of the carrier 38. The inner portion 40 includes a receiver 60 defined therein for receiving another extension portion 62 of the airfoil shell 22. The extension portion 62 engages the carrier 38 via the receiver 60 to provide radial and axial load transfer. An optional compliant layer may be arranged between the extension portion 62 and the carrier 38 to provide ease of contact.

Figure 4:
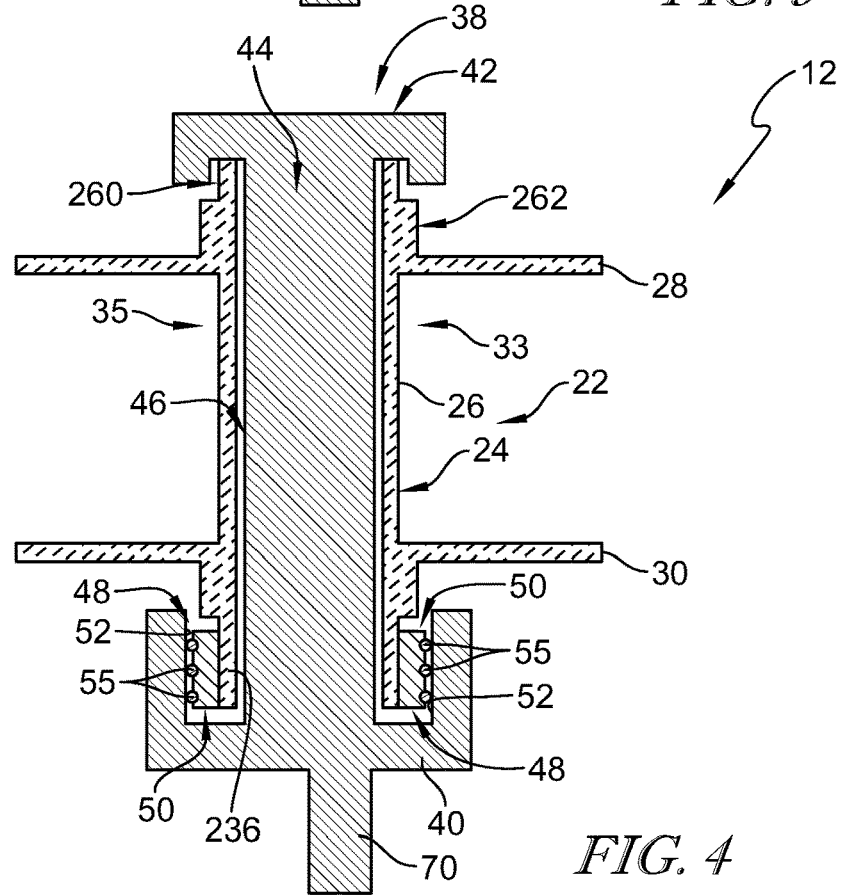
FIG. 4 is a cross-sectional view of another embodiment of the airfoil assembly of FIG. 2 in an assembled state, taken along the plane 3-3 of FIG. 2, showing that the roller joint is disposed on the radially inner connection of the airfoil shell and the carrier.

As shown in FIG. 4, another illustrative embodiment of the airfoil assembly 12 includes the airfoil shell 22 having an extension portion 236 with the roller joint 48 arranged on a radially inner end. The extension portion 236 is similar to the extension portions 236 is similar to extension portion 36, although is arranged on the radially inward end of the airfoil body 24. At the radially outer end, another extension portion 262 engages a receiver 260 of the carrier 28 to provide radial and axial load transfer. The roller elements 55 provide sliding (rolling) contact with the surface 52 to accommodate relative radial movement, for example, from different thermal growth rates of the airfoil shell 22 and the carrier 38.

Figure 5:
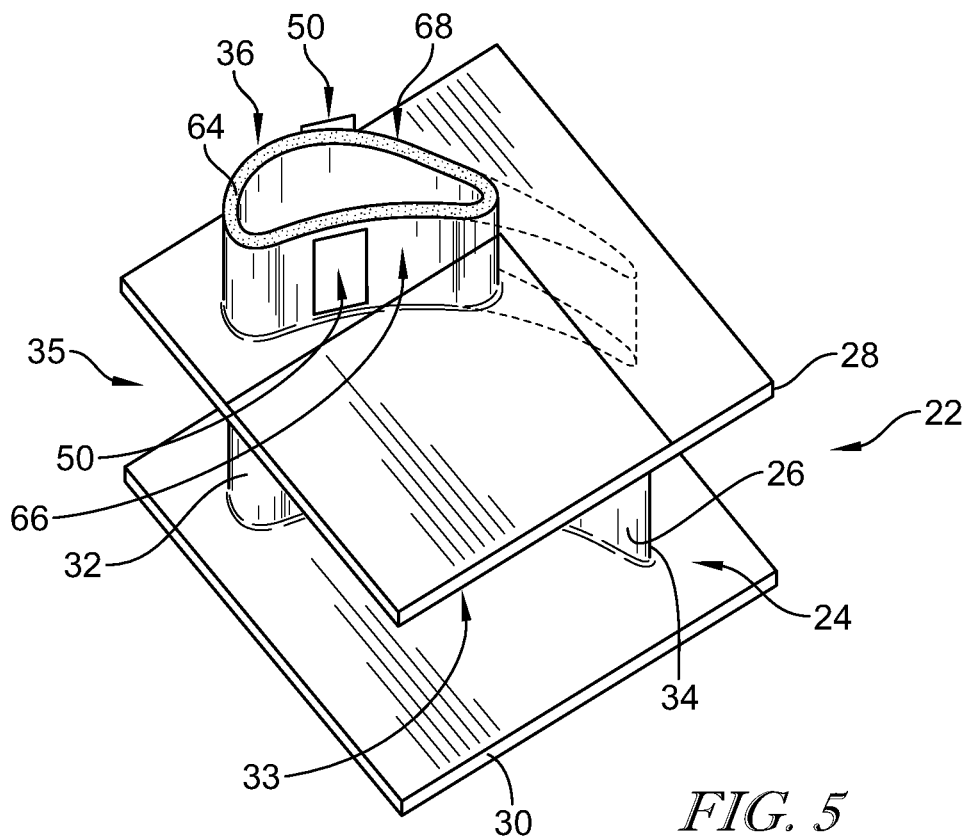
FIG. 5 is a perspective view of the airfoil assembly of FIG. 2 showing that an extension portion of the airfoil shell for connection with the carrier is formed to extend radially having a shape corresponding to the shape of an airfoil body of the airfoil shell, and more particularly to a leading portion (shown in solid line) of the airfoil body, and showing that the extension portion can optionally be formed to have a shape corresponding to the entire airfoil body (shown additionally in dashed line)

As shown in FIG. 5, the airfoil shell 22 is shown in isolation to illustrate that extension portion 36 in additional detail. The extension portion 36 is illustratively shaped corresponding to the airfoil shape of the exterior surface 26 of the airfoil body 24. The extension portion 36, 236 includes a wall 64 extending radially outward from the endwall 30. Although the illustrative embodiment includes extension portions shaped to correspond with the airfoil shape, in some embodiments, the extension portions may be shaped to have any suitable shape including but without limitation cylindrical, ovular, square, and/or other standard or non-standard shapes.

The roller bearings 50 are illustratively arranged on the sides 66, 68 respectively corresponding to the pressure and suction sides 33, 36 of the airfoil body 24. The bearing races 54 are embodied to be formed to have corresponding contour with their respective sides 33, 36. As shown in broken line, in some embodiments, the extension portion may extend to have a shape corresponding to the entire airfoil shape of the body 14. The receiver 60, 260 of the carrier 38 is illustratively formed to have corresponding (negative) shape to the extension portion 36, 236.

Figure 6:
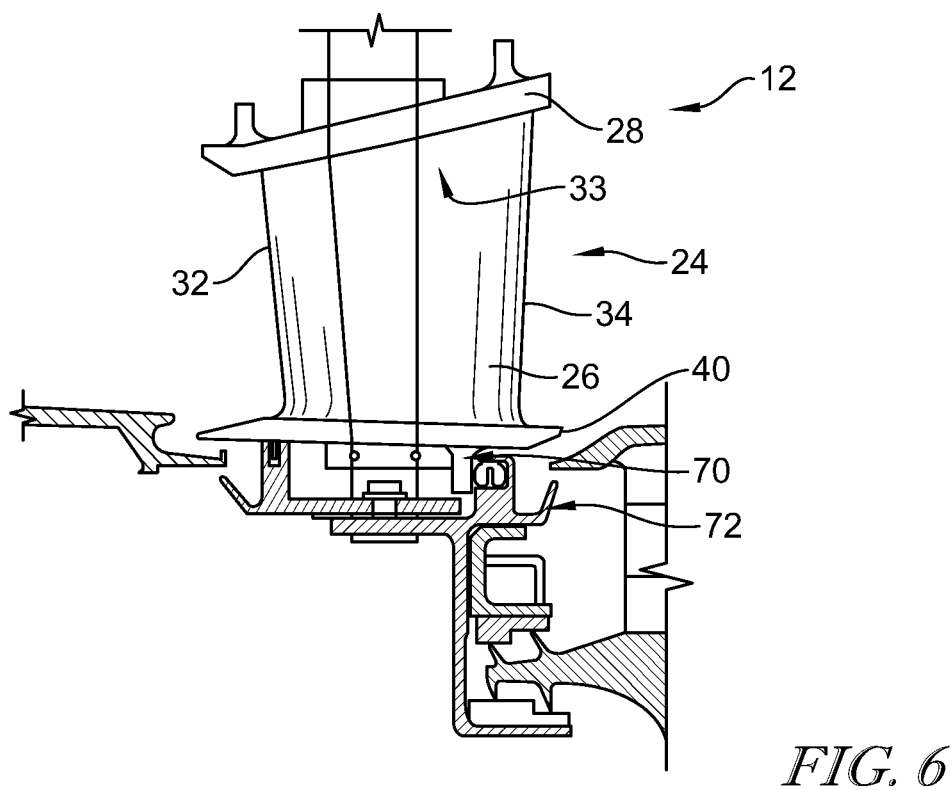
FIG. 6 is an elevation view the airfoil assembly of FIG. 2 showing that the carrier can include a spar extension for connection with an inner annulus.

Referring to FIG. 6, carrier 38 includes a spar 70 extending radially inward from the inner portion 40. The spar 70 illustratively connects with a retainer 72. The retainer 72 provides additional structural support to the assembly 12. In some embodiments, the spar 44 of the carrier 38 may also connect with the retainer 72.

Figure 7:
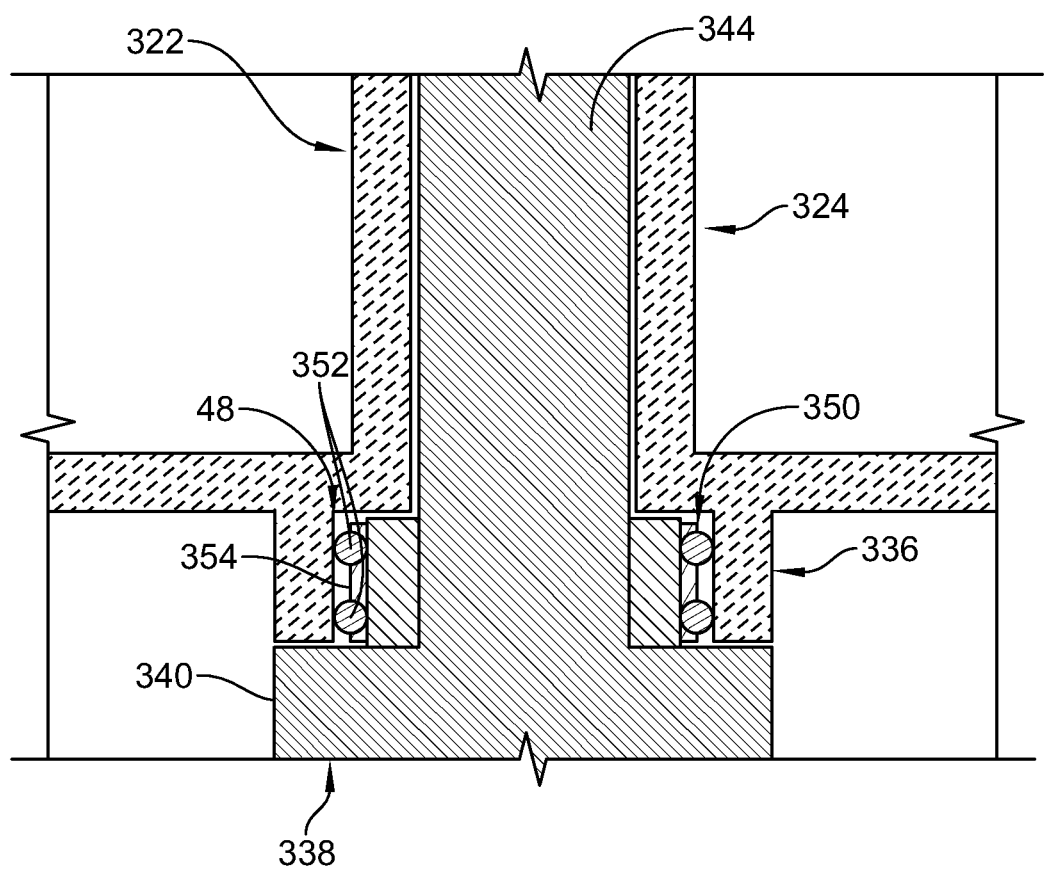
FIG. 7 is closer cross-sectional view of another embodiment of the airfoil assembly of FIG. 2 in an assembled state, taken along the plane 3-3 of FIG. 2, showing that roller elements are disposed on the carrier and engage with the airfoil shell.

Referring to FIG. 7, another embodiment of an airfoil assembly 312 adapted for use in the gas turbine engine 10 is shown. The airfoil assembly 312 is similar to airfoil assembly 12 and such disclosure of airfoil assembly 12 applies equally to airfoil assembly 312, except in instances of conflict with the specific disclosure of airfoil assembly 312.

The airfoil assembly 312 includes rolling joints 48 for radial sliding (rolling) relative movement between the airfoil shell 322 and the carrier 338. The roller joints 48 include bearing race (inner and outer) 354 secured with the carrier 338 to position the roller elements 355 engaged with the bearing surface 352. The bearing surface 352 is formed on the extension portion 336 of the airfoil shell 22. In some embodiments, an additional bearing material may be applied to the extension portion 336 to form the bearing surface 352. Accordingly, the roller bearings 50 can be secured with the carrier 338 and can move therewith relative to the airfoil shell 322.

The load from High Pressure Stage 2 (HP2) Nozzle Guide Vanes (NGVs) can be transmitted outboard to the High Pressure Turbine (HPT) casing. In metallic embodiments, the NGV structure may be supported on hooks and/or rails attached to the outer platform. This design may not be appropriate for structures manufactured from the SiC/SiC CMC materials which can have lower strength than those including significant metallics. One solution to this challenge may include transferring the aerodynamic loading at one or both the inner and outer extents of the vane.

The load may transmit through a metallic structure or spar out into the casing. However, the CMC material may have a significantly lower coefficient of thermal expansion compared to the high temperature metals. Thus, there may be a significant mismatch in radial height between cold build and the hottest operating conditions for the CMC and metallic structure.

Devices, systems, and methods with the present disclosure may include designs and arrangement to address the alpha growth mismatch by employing a roller joint as one of the platform load transfer features. Axial and circumferential aerodynamic loads can be transmitted through the contact while allowing radial growth. The roller joint may be employed at either the inner or outer joint, depending on the resultant radial loading and HP turbine architectural constraints. The location for optimum thermal management or optimum load transfer (lowest load) can be selected according to design needs.

Multiple rows of bearings could be applied to increase the load transfer capability. The bearing support structure and/or rolling contact material may be chosen to minimize the coefficient of friction at this joint (e.g. silicon nitride bearings) against metallic supports. The bearings may be embodied as ball bearings to handle relative motion in multiple directions as needed. In some embodiments, a string of metallic bearings may be fed through a hole into a "helical" track. Once assembled, the assembly hole can be plugged.

One potential issue of this design may include thermal growth of the the inner race for the bearings. The problem is the large relative thermal growth difference between the metallic race and the CMC component. In some embodiments, distinct races may be eliminated and the ball bearings may be arranged to rotate within the metallic carrier and ride directly against the CMC surface or a barrier placed thereon. In some embodiments, the inner race may be formed by multiple pieces with gaps. For example, in some embodiments, the bearing race may be formed by two (or more) portions, split at the leading edge and trailing edge of the airfoil. As the CMC grew less than the inner race, the two race halves would maintain pressure against the sides of the CMC, but the gaps between the two pieces may close.

In some embodiments, the inner race may be permitted to outgrow the CMC such that the predominate side load would load one side of the race (only) against the CMC. Because the friction at the race to CMC interface will be higher than the friction of the balls rolling, the inner race will load against the CMC without relative motion. In some embodiments, the bearings may extend circumferentially about the entire extension portion.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly of a gas turbine engine, the assembly comprising:

a ceramic airfoil including a pair of endwalls defining a radial gas flow path extent an airfoil body extending radially between the endwalls, and an extension portion that extends radially away from one endwall of the pair of endwalls, the airfoil body defining an internal cavity extending radially and communicating through each endwall, a metallic support carrier for supporting the ceramic airfoil, the metallic support carrier including radially inner and outer portions each defining receivers for engagement with the ceramic airfoil, and a roller joint for supporting rolling engagement between the ceramic airfoil and the metallic support carrier to accommodate radial thermal growth disparity, the roller joint including a roller race disposed on one of the ceramic airfoil and the metallic support carrier and at least one rolling element supported by the roller race and engaged with the other of the ceramic airfoil and the metallic support carrier, wherein the extension portion of the ceramic airfoil is located in one of the receivers, the roller race is fixed with one of the extension portion of the ceramic airfoil and one of the radially inner and outer portions of the metallic support carrier, and the at least one rolling element engages a roller engagement surface for supporting radial rolling movement of the rolling element that is defined by the other of the extension portion of the ceramic airfoil and the one of the radially inner and outer portions of the metallic support carrier.

2. The airfoil assembly of claim 1, wherein the roller engagement surface for supporting radial rolling movement of the rolling element is formed on the support carrier.

3. The airfoil assembly of claim 2, wherein the roller engagement surface is a radially oriented surface defining a portion of one of the receivers.

4. The airfoil assembly of claim 1, wherein the at least one rolling element includes at least two rolling elements.

5. The airfoil assembly of claim 4, wherein the at least two rolling elements are arranged radially spaced apart from each other.

6. The airfoil assembly of claim 1, wherein the roller race is fixed with the extension portion of the ceramic airfoil.

7. The airfoil assembly of claim 6, wherein the at least one rolling element is exposed from the roller race perpendicular to the roller engagement surface of the support carrier for engagement with the support carrier.

8. A vane airfoil assembly of a gas turbine engine, the assembly comprising:

a ceramic vane airfoil including a pair of endwalls defining a radial gas flow path extent, and a body extending radially between the endwalls, the body defining an internal cavity extending radially and communicating through each endwall, a support carrier for supporting the vane airfoil, the support carrier including radially inner and outer portions each defining receivers for engagement with the vane airfoil, and a roller joint for supporting axial load transfer between the vane airfoil and the support carrier to accommodate radial thermal growth disparity, the roller joint including a roller race disposed on one of the vane airfoil and the support carrier and at least one rolling element supported by the roller race and engaged with the other of the vane airfoil and the support carrier.

9. The vane airfoil assembly of claim 8, wherein the roller joint is arranged in one of the receivers of the radially inner and outer portions.

10. The vane airfoil assembly of claim 9, wherein the roller race is disposed on the vane airfoil.

11. The vane airfoil assembly of claim 10, wherein a roller engagement surface for supporting radial rolling movement of the rolling element is formed on the support carrier.

12. The vane airfoil assembly of claim 11, wherein the roller engagement surface is a radially oriented surface defining a portion of one of the receivers.

13. The vane airfoil assembly of claim 8, wherein the at least one rolling element includes at least two rolling elements.

14. The vane airfoil assembly of claim 13, wherein the at least two rolling elements are arranged radially spaced apart from each other.

15. The vane airfoil assembly of claim 8, wherein the vane airfoil includes an extension portion that projects radially from one of the endwalls for engagement with the corresponding one of the radially inner and outer portions of the support carrier.

16. The vane airfoil assembly of claim 15, wherein the roller race is secured with the extension portion of the vane airfoil.

17. The vane airfoil assembly of claim 16, wherein the at least one rolling element is exposed from the roller race perpendicular to a roller engagement surface formed on the support carrier for engagement with the support carrier.

* * * * *